United States Patent [19]

Honkaniemi et al.

[11] Patent Number: 4,478,802
[45] Date of Patent: Oct. 23, 1984

[54] METHOD FOR CLEANING CYANIDE-BEARING GAS SCRUBBING WATERS PRODUCED IN METALLURGICAL INDUSTRY

[75] Inventors: Matti E. Honkaniemi; Veikko A. Juntunen, both of Tornio; Veli J. Keinänen; Urpo J. Mansikka, both of Kokkokangas, all of Finland

[73] Assignee: Outokumpu Oy, Helsinki, Finland

[21] Appl. No.: 531,175

[22] Filed: Sep. 8, 1983

[30] Foreign Application Priority Data

Sep. 9, 1982 [FI] Finland ................................ 823130

[51] Int. Cl.³ .................. C21B 13/02; B01D 13/00; B01D 55/34
[52] U.S. Cl. .................................. 423/236; 75/25; 55/84; 55/89; 55/220; 55/223; 210/150
[58] Field of Search ............... 75/25; 55/84, 89, 220, 55/223; 210/150; 423/236

[56] References Cited

U.S. PATENT DOCUMENTS

| | | | |
|---|---|---|---|
| 1,310,480 | 7/1919 | Haslup | 423/236 |
| 3,928,023 | 12/1975 | Claflin | 75/25 |
| 3,990,886 | 11/1976 | Sunter | 75/25 |
| 4,135,914 | 1/1979 | Vuletic et al. | 75/25 |

*Primary Examiner*—R. L. Andrews
*Attorney, Agent, or Firm*—John Smith-Hill

[57] ABSTRACT

In the invention, cyanide-bearing gas scrubbing waters, which are produced in metallurgical processes, are cleaned. The same scrubbing water is circulated through all gas scrubbers (1, 3) essentially connected to the metallurgical process. The solid substance which is thus acquired in the scrubbing water is separated from the scrubbing water in a clarifier (4), wherefrom the extracted solid substance is conducted as pulp into the grinding circle of the process. The cyanide-bearing scrubbing water is further conducted into the cooling (9) of the material received from the metallurgical process smelting furnace. In the cooling (b 9), the major part of the cyanide is evaporized due to the rise in temperature.

9 Claims, 1 Drawing Figure

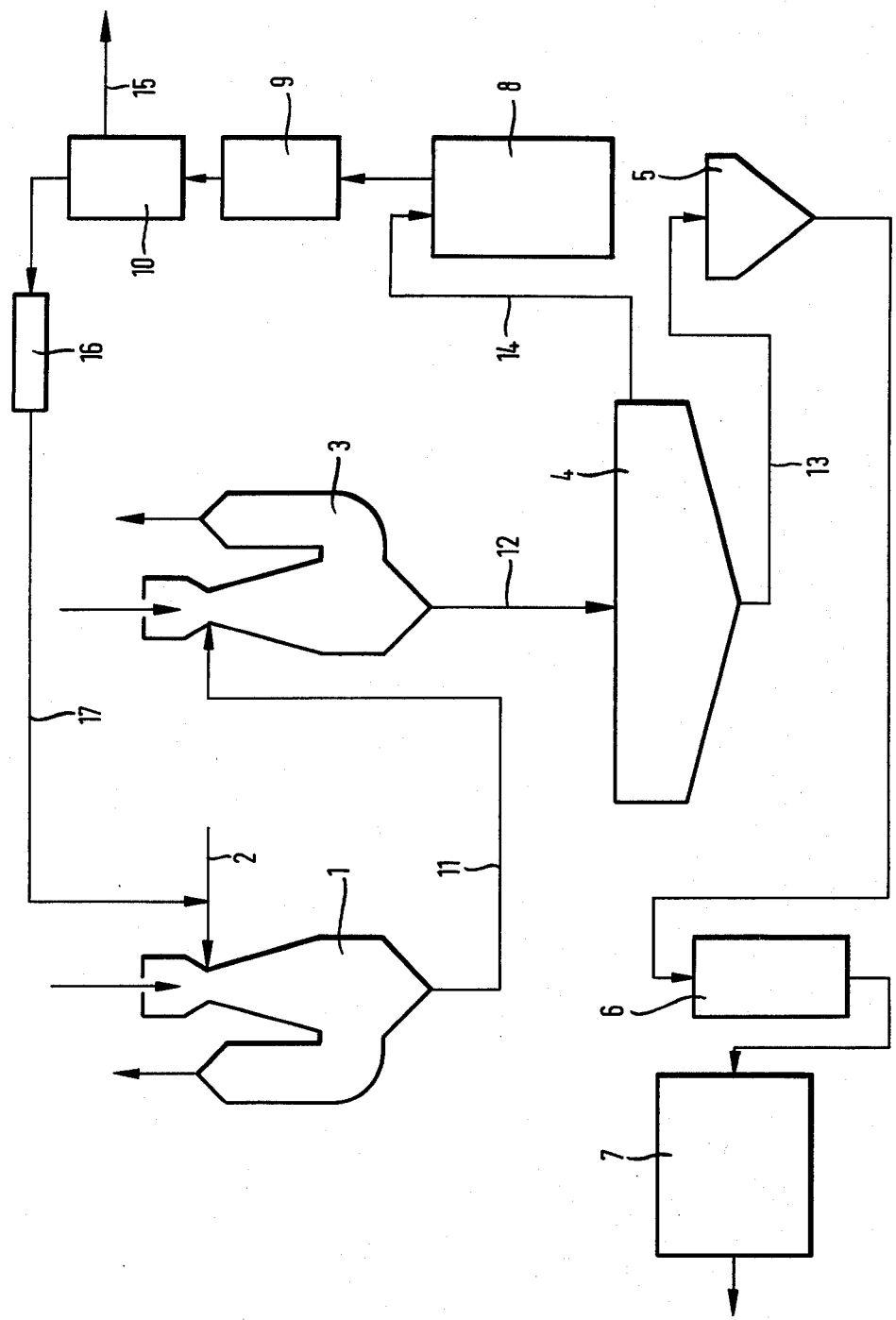

METHOD FOR CLEANING CYANIDE-BEARING GAS SCRUBBING WATERS PRODUCED IN METALLURGICAL INDUSTRY

The present invention relates to a method for cleaning cyanide-bearing gas scrubbing waters produced in metallurgical industry by means of circulating the same scrubbing water through all gas scrubbers essentially connected to the metallurgical process and by extracting the solid substance contained in the effluent before releasing the effluent into a clarification basin. Particularly the present invention relates to a method where the solid substance, extracted from such gas scrubbing waters that have been used for cleaning cyanide-bearing gases produced when reducing oxidized ores by carbon or coke, can be directly returned to the process and where the scrubbing water can be used, while cyanide is being driven off as the cooling water for the material received from a metallurgical process smelting furnace.

It is characteristic of both blast furnaces used in steel production and closed ferro-chrome furnaces that under the process conditions gases are generated which contain cyanide in addition to carbon monoxide, carbon dioxide and hydrogen. Since the furnace gas also contains a considerable amount of solid substances, the gas has to be cleaned before use or further processing. Gases are generally cleaned in wet scrubbers, such as venturi scrubbers, where the solids and water-soluble gases are scrubbed with water. Consequently, the scrubbed water solution contains, in addition to solid substance, cyanide which is harmful for nature. In the prior art there have been several attempts to lower the cyanide content of the scrubbing water solution.

The cyanide content of the scrubbing water can be lowered by oxidizing the scrubbing water. According to one prior art oxidizing method, the cyanide-bearing water is conducted through a thickener into a condensing tower (aeration tower) and therefrom further back to the gas scrubber or directly into a clarification basin system. In another prior art oxidizing method the scrubbing water is conducted through a thickener and a heat-exhanger back into the gas scrubber. The cyanide, which follows as the underflow of the thickener, is oxidized by means of chlorine addition. By employing such oxidizing methods, the cyanide content is considerably decreased, but the use of these methods brings forth many dangers: if the scrubber nozzles are blocked, it may lead to an explosion owing to the CO-gas contained in the atmosphere, or a sudden blocking of the pipework dust may cause an unexpected surge of the effluent into the clarification basin and further into the water course.

In the prior art is also known a method where cyanide-bearing gas scrubbing waters are treated so that the cyanide is bound into complex ions. But this method requires expensive reagents, which causes the investment and running costs of the method to climb considerably high.

The Finnish Pat. No. 62040 introduces a method for cleaning cyanide-bearing furnace gases by changing the pH-value of the scrubbing water solution so that it becomes more acidic. The change in the pH-value is achieved by mixing sulphuric acid into the scrubbing water solution before the solution is conducted into the gas scrubbers. This method causes the cyanide content of the scrubbing water to decreasek, but simultaneously the zinc contained in the cleaned gases is dissolved into the scrubbing water and brings forth new limitations for the effluent discharge.

The purpose of the present invention is to eliminate the disadvantages of the prior art methods described above and to achieve a new and better method for cleaning cyanide-bearing gases produced in metallurgical industry by feeding the solid substance contained in the scrubbing waters directly back into the metallurgical process after clarification, and employing the clarified scrubbing water as the cooling water of the material received from the metallurgical process smelting furnace, whereafter the scrubbing water is conducted into a clarification basin system. From the clarification basins the scrubbing water can be circulated back into gas scrubbing after a possible heat exchange treatment. The essential characteristics of the invention are enlisted in the appended patent claim 1.

According to the invention, the scrubbing water meant for the cleaning of cyanide-bearing gases produced in metallurgical processes is conducted through all gas scrubbers essentially connected to the metallurgical process, first, for example, through the scrubber of the metallurgical process smelting furnace gases and thereafter through the scrubber of the process preheating furnace gases. In the preheating furnace scrubber, the cyanide-containing gases, which are mostly produced in the metallurgical process smelting furnace, get into contact with hot gases, in which case part of the cyanide content of the water is driven off, as the balance is shifted, owing to the temperature, towards hydrogen cyanide which is readily driven off. From the preheating furnace scrubber the scrubbing water is further pumped into the clarifier, where the solid substance contained in the scrubbing water is separated under the presence of a flocculation agent. The solid substance is further conducted into the metallurgical process grinding mills and thereafter fed back into the process. The clarified water is pumped into a tank, whereafter it can be used for cooling the material received from a metallurgical process smelting furnace, for instance for granulating slag. In order to improve the elimination of cyanide, the water can be ozonized simultaneously with the cooling. The water used for cooling is further conducted into the clarification basins, where cyanide is driven off over a substantial time. Thereafter the water used for gas scrubbing can safely be released into the watercourse. From the clarification basins the water can also be conducted back into gas scrubbing, because at that stage the cyanide content is already sufficiently low. When necessary, it is also possible to give a heat exhange treatment for the circulated scrubbing water.

By employing the method of the present invention for cleaning cyanide-bearing gas scrubbing waters prouced in metallurgical industry, the amount of water which is needed for scrubbing the gases and for cooling the material received from the smelting furnace can be substantially reduced. This in turn considerably reduces the investment and running costs of the metallurgical process. Moreover, the waste heat produced in the process can be efficiently utilized. At the same time the effluent discharges into the watercourse become lesser as regards both their total amount and their cyanide content. In addition to this, part of the water used by the grinding mills can be replaced by the pulp received from the clarifier, because in the invention the solid substance contained in the scrubbing water is extracted as pulp by the clarifier.

In the following the invention is explained with reference to the appended drawing, where the single FIGURE is a process diagram of one preferred embodiment of the invention.

According to the FIGURE, the gas scrubbing water is conducted through the pipe 2 into the gas scrubber 1 of a metallurgical process smelting furnace. The cyanide-bearing water 11 received from the gas scrubber 1 is further conducted into the gas scrubber 3 of a metallurgical process prfeheating furnace, where part of the cyanide contained in the scrubbing water is driven off due to the rise in temperature. From the scrubber 3 the cyanide-bearing scrubbing water 12 is pumped into the clarifier 4, where the solid substance contained in the scrubbing water is extracted in the presence of a flocculation agent. The solid substance 13 is conducted as pulp through the thickener 5 and the intermediate tank 6 into the grinding mills 7 for the metallurgical process feed material, where the pulp replaces part of the water needed by the mills 7 and also part of the feed material. From the clarifier, where part of the cyanide contained in the scrubbing water is extracted into the pulp, the scrubbing water 14 is pumped into the granulation tank 8. Owing to the high temperature rise that takes place in the granulation 9, the major part of the cyanide contained in the scrubbing water is extracted into the gas phase. From the granulation 9, where the scrubbinbg water can also be ozonized when necessary, the scrubbing water 16 is conducted into the clarification basins 10. From the clarification basins 10 the scrubbing water can be released into the watercourse, as indicated at 15, or it can be circulated, after possible heat exhange treatment 16, through the pipe 2 back into the gas scrubber 1 as indicated at 17.

EXAMPLE

According to the method of the invention, 72 m³ gas scrubbing water, which was received from the watercourse, was fed into a smelting furnace gas scrubber. The resulting scrubbing water contained 18.2 mg/l cyanide. This cyanide-bearing water was conducted into the gas scrubber of the preheating furnace, where part of the cyanide was driven off as hydrogen cyanide due to the rise in temperature. The scrubbing water received from the preheating furnace gas scrubber, which water contained 6.2 mg/l cyanide, was pumped into a clarifier, where part of the cyanide was extracted into the grinding cycle together with the pulp containing the solid substance. After the clarifier the cyanide content of the scrubbing water was 4.6 mg/l. This cyanide-bearing scrubbing water was further used in granulating the slag, at which stage the cyanide content was remarkably reduced, being only 0.19 mg/l. As a result of the evaporation taking place in the clarification basins, the cyanide content of the water which was released into the watercourse was only 0.11 mg/l.

We claim:

1. A method of treating cyanide-bearing scrubbing waters produced in a metallurgical process, comprising the following steps in the order stated:
   (a) conducting the scrubbing water sequentially through a plurality of gas scrubbers that are utlilized in the metallurgical process, whereby the scrubbing water is heated and some of the cyanide present in the scrubbing water is driven off from the scrubbing water;
   (b) passing the scrubbing water that has been conducted through the gas scrubbers to a clarifier, whreby solid material contained in the scrubbing water is extracted; and
   (c) removing scrubbing water from the clarifier and using it to cool solid material received from the metallurgical process, whereby the scrubbing water is further heated and additional cyanide is driven off.

2. A method according to claim 1, wherein the scrubbing water is conducted through a first scrubber for cleaning gases from a smelting furnace and through a second scrubber for cleaning gases from a preheating furnace.

3. A method according to claim 2, comprising the additional step, after step (c), of returning the scrubbing water to the first scrubber.

4. A method according to claim 1, wherein the scrubbing water is conducted through a scrubber for cleaning gases from a smelting furnace, the solid material that is cooled in step (c) is slag from the metallurgical process, and the scrubbing water is used in the granulation of the slag.

5. A method according to claim 1, comprising the additional step, after step (c), of returning the scrubbing water to one of the gas scrubbers referred to in step (a).

6. A method according to claim 1, comprising the steps of conducting solid material extracted in step (b) as a pulp from the clarifier and grinding such solid material together with feed material for the metallurgical process.

7. A method according to claim 1, comprising the additional step, after step (c), of cooling the scrubbing water in a clarification basin.

8. A method according to claim 7, wherein the cyanide content of the cooled scrubbing water in the clarification basin is 0.2 mg/l at most.

9. A method according to claim 8, wherein said cyanide content is 0.1 mg/l at most.

* * * * *